(12) United States Patent
Yasui (10) Patent No.: US 12,462,517 B2
(45) Date of Patent: Nov. 4, 2025

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventor: Masahiro Yasui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 535 days.

(21) Appl. No.: 17/873,169

(22) Filed: Jul. 26, 2022

(65) Prior Publication Data

US 2023/0306704 A1    Sep. 28, 2023

(30) Foreign Application Priority Data

Mar. 28, 2022 (JP) ................ 2022-052256

(51) Int. Cl.
*G06V 10/12*  (2022.01)
*G06T 11/00*  (2006.01)

(52) U.S. Cl.
CPC ............ *G06V 10/12* (2022.01); *G06T 11/00* (2013.01)

(58) Field of Classification Search
CPC ................ G06V 10/12; G06V 11/00
USPC ................................. 382/312
See application file for complete search history.

(56) References Cited

U.S. PATENT DOCUMENTS

| | | | |
|---|---|---|---|
| 2016/0277604 A1* | 9/2016 | Okazato | H04N 1/32523 |
| 2018/0069969 A1* | 3/2018 | Harada | H04N 1/00954 |
| 2019/0109960 A1* | 4/2019 | Ito | H04N 1/00244 |

FOREIGN PATENT DOCUMENTS

| | | |
|---|---|---|
| JP | 2013161462 | 8/2013 |
| JP | 2018092480 A * | 6/2018 |
| JP | 2020170984 | 10/2020 |

* cited by examiner

*Primary Examiner* — Jonathan S Lee
(74) *Attorney, Agent, or Firm* — JCIPRNET (57) ABSTRACT

An information processing apparatus includes a processor configured to acquire plural objects indicating virtual image forming apparatuses generated by using setting information set in a predetermined image forming apparatus and capable of simulating a process executed by the image forming apparatus, perform control to synchronize the setting information between a first object among the plural objects and the image forming apparatus, and perform control to simulate the process executed by the image forming apparatus using a second object different from the first object.

19 Claims, 8 Drawing Sheets

| ID | TYPE | CONTENT |
|---|---|---|
| 1 | LOG | CONFIRM MACHINE<br>OUTPUT REPORT<br>OUTPUT SETTING LIST |
| 2 | FORM | BILL A |
| 3 | FORM | DESIGN DRAWING C |
| ... | ... | ... |

| SETTING ITEM NAME | VALUE |
|---|---|
| MAIL | INVALID |
| ... | ... |

| SETTING ITEM NAME | VALUE |
|---|---|
| MAIL | VALID |
| ... | ... |

FIG. 12

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-052256 filed Mar. 28, 2022.

BACKGROUND

(i) Technical Field

The present invention relates to an information processing apparatus, a non-transitory computer readable medium storing a program, and an information processing method.

(ii) Related Art

JP2020-170984A discloses an information processing apparatus including an update processing unit that updates an application program to a new version, a test data acquisition unit that acquires test data generated based on a setting value recorded in history information, and an operation confirmation unit that starts a second application corresponding to the application program updated in a case where the application program is updated by the update processing unit, inputs the test data to the second application and verifies whether or not each of the second application and an application cooperation unit normally operate under a predetermined condition.

In JP2013-161462A, a job history information audit server holds a list of new function supportable devices and digital multifunction device information. There is disclosed a history information audit system that determines that there is a possibility that the device supports new functions in a case where the digital multifunction device information is included in the list of new function supportable devices, and updates an installed job history information audit agent, thereafter, in which the job history information audit agent determines whether or not the device is supporting the new functions, and, in a case where the support is completed, transmits setting information in which the new function is valid to the job history information audit server.

SUMMARY

By the way, in a virtual image forming apparatus formed to be executable by a computer using setting information set in an image forming apparatus, it is possible to verify an operation in an actual image forming apparatus by simulating a process. However, during simulation of the process in the virtual image forming apparatus, setting information set for the virtual image forming apparatus during the simulation cannot be reflected.

Aspects of non-limiting embodiments of the present disclosure relate to an information processing apparatus, a non-transitory computer readable medium storing a program, and an information processing method, which, in a case where a process of the image forming apparatus is simulated in a virtual image forming apparatus formed using setting of the image forming apparatus, can apply setting of an actual image forming apparatus to the virtual image forming apparatus even during simulation of the process.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire a plurality of objects indicating virtual image forming apparatuses generated by using setting information set in a predetermined image forming apparatus and capable of simulating a process executed by the image forming apparatus, perform control to synchronize the setting information between a first object among the plurality of objects and the image forming apparatus, and perform control to simulate the process executed by the image forming apparatus using a second object different from the first object.

BRIEF DESCRIPTION OF THE DRAWINGS

Exemplary embodiment(s) of the present invention will be described in detail based on the following figures, wherein.

DETAILED DESCRIPTION

Hereinafter, examples of exemplary embodiments for carrying out the technique of the present disclosure will be described in detail with reference to the drawings. Components and processes having the same operation, action, and function may be given the same reference numerals throughout the drawings, and duplicate explanations may be omitted as appropriate. Each drawing is only schematically shown to the extent that the technique of the present disclosure can be fully understood. Therefore, the technique of the present disclosure is not limited to the illustrated examples. Further, in the present exemplary embodiments, the description may be omitted for a configuration not directly related to the present invention or a well-known configuration.

First Exemplary Embodiment

Figure 1:
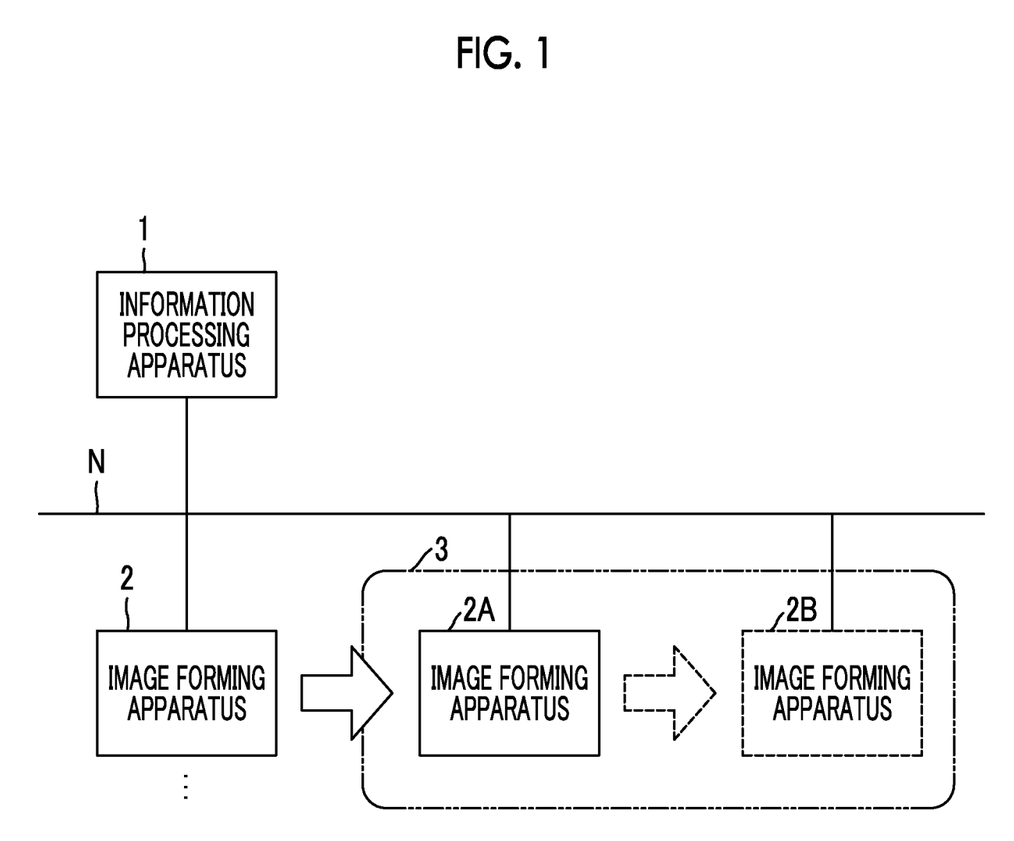
FIG. 1 is a diagram showing an example of a schematic configuration of an information processing system according to an exemplary embodiment.

FIG. 1 is a diagram showing an example of a schematic configuration of an information processing system according to an exemplary embodiment for implementing the technique of the present disclosure.

The information processing system shown in FIG. 1 includes an information processing apparatus 1, an image forming apparatus 2, an image forming apparatus 2A, an image forming apparatus 2B, and a cloud network 3. As an example, a general-purpose computer apparatus, such as a server computer or a Personal Computer (PC) is applied to the information processing apparatus 1.

The information processing apparatus 1 is configured to be connectable to the image forming apparatus 2, the image forming apparatus 2A, the image forming apparatus 2B, and the cloud network 3 via a network N. The information processing apparatus 1 is connectable to a terminal device (not shown) via the network N. As an example of the network N, a network, such as the Internet, a public communication line including a telephone line network, a Local Area Network (LAN), or a Wide Area Network (WAN), is applied. Further, at least one network of wired or wireless communication lines can be applied to the network N.

The image forming apparatus 2 is an apparatus installed in an actual environment, and is a multifunction device having a plurality of functions among a plurality of functions such as a copy function, a print function, a scanner function, a facsimile function, and an Optical Character Recognition (OCR) function. For example, in a case where the image forming apparatus 2 receives a print job from a terminal device (not shown) such as a PC, the image forming apparatus 2 executes a print process based on the print job. Further, for example, the image forming apparatus 2 has a function of scanning a document and transmitting scanned data to the terminal device (not shown) or the like.

The cloud network 3 is a network on the cloud in which virtual image forming apparatuses 2A and 2B that store the settings of the image forming apparatus 2 in synchronization with the image forming apparatus 2 exist. The virtual image forming apparatus 2A stores the settings of the image forming apparatus 2 in synchronization with the image forming apparatus 2. As described above, the image forming apparatus 2 installed in the actual environment and the virtual image forming apparatus 2A existing in the cloud network 3 have a one-to-one correspondence.

Further, the virtual image forming apparatus 2B is an image forming apparatus generated by duplicating the settings of the image forming apparatus 2A as needed, as will be described in detail later.

The virtual image forming apparatuses 2A and 2B do not exist as an image forming apparatus, but exist as an object for storing the settings of the image forming apparatus 2 and functioning as an image forming apparatus according to the settings. The object includes a function of executing various processes operated by the image forming apparatus 2 according to the settings. Therefore, using the object, it is possible to verify the process executed by the image forming apparatus 2, that is, to verify the operation of the image forming apparatus 2.

That is, the virtual image forming apparatuses 2A and 2B are objects, at least a part of which functions as a virtualized device. The virtual image forming apparatuses 2A and 2B can be constructed in the cloud network 3. For example, the virtual image forming apparatuses 2A and 2B can be constructed on a server or the like. Therefore, the virtual image forming apparatuses 2A and 2B can be constructed on the network N using a cloud computing technique, and can be used equivalently to a virtual hardware resource which is the same as the image forming apparatus 2.

The virtual image forming apparatus 2A and 2B are not limited to the object functioning as the image forming apparatus 2. For example, the virtual image forming apparatus 2A may be formed as an object that stores only the settings of the image forming apparatus 2. The virtual image forming apparatus 2B may be an object configured to store the settings of the virtual image forming apparatus 2A and to verify the operation of the image forming apparatus 2 according to the stored settings.

Figure 2:
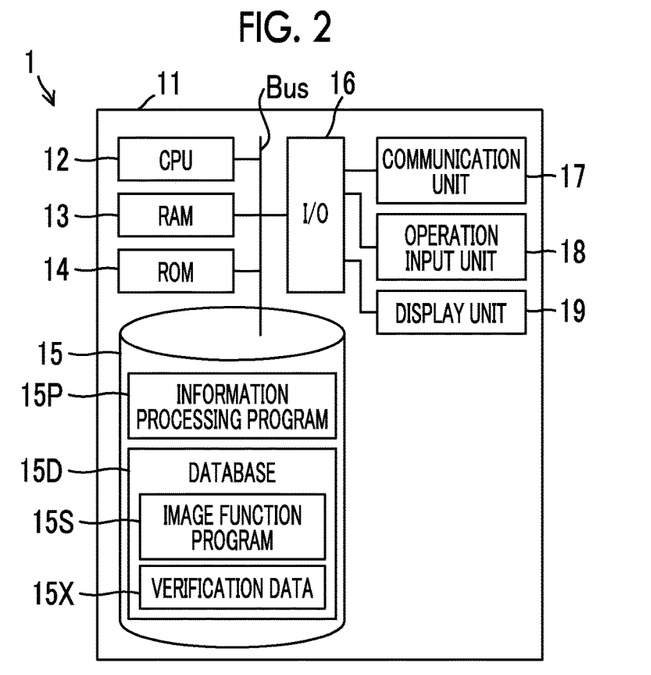
FIG. 2 is a diagram showing an example of an electrical schematic configuration of an information processing apparatus according to an exemplary embodiment.

Next, an example of a configuration of the information processing apparatus 1 will be described with reference to FIG. 2. FIG. 2 is a diagram showing an example of an electrical schematic configuration of the information processing apparatus 1 according to the present exemplary embodiment. As the information processing apparatus 1, for example, a general-purpose computer apparatus, such as a server computer or a PC, is applied.

Specifically, as shown in FIG. 2, the information processing apparatus 1 includes a computer main body 11. The computer main body 11 includes a Central Processing Unit (CPU) 12, a Random Access Memory (RAM) 13, a Read-Only memory (ROM) 14, a storage unit 15, and an input/output port (I/O) 16. The CPU 12, the RAM 13, the ROM 14, the storage unit 15, and the I/O 16 are connected to each other via a bus Bus.

Further, the I/O 16 is connected to respective functional units including a communication unit 17 that enables communication with an external device, an operation input unit 18 that enables operation input by a user, and a display unit 19 that enables image display. Each of the functional units can communicate with the CPU 12 via the I/O 16.

The computer main body 11 may be configured as a sub control unit that controls the partial operation of the information processing apparatus 1, or may be configured as a part of a main control unit that controls the overall operation of the information processing apparatus 1. For example, an integrated circuit such as a Large Scale Integration (LSI) or an Integrated Circuit (IC) chipset is used for a part or all of each of the blocks of the computer main body 11. An individual circuit may be used for each of the blocks, or a circuit, a part or all of which are integrated, may be used. Each of the blocks may be provided integrally, or a part of the blocks may be provided separately. In addition, a part of each of the blocks may be provided separately. The integration of the computer main body 11 is not limited to the LSI, and a dedicated circuit or a general-purpose processor may be used.

As the storage unit 15, for example, an auxiliary storage device such as a Hard Disk Drive (HDD), a Solid State Drive (SSD), or a flash memory is used. The storage unit 15 stores an information processing program 15P for causing the information processing apparatus 1 to function as the information processing apparatus according to an exemplary embodiment of the present disclosure. The CPU 12 reads the information processing program 15P from the storage unit 15, and expands the information processing program 15P into the RAM 13 to execute a process. As a result, the information processing apparatus 1 that executes the information processing program 15P operates as the information processing apparatus according to the exemplary embodiment of the present disclosure. The specific processing of the information processing apparatus 1 will be described later.

The information processing program 15P may be stored in the ROM 14. Further, the information processing program 15P may be installed in, for example, the information processing apparatus 1 in advance. The information processing program 15P may be realized by being stored in a non-volatile storage medium or appropriately installing program information distributed via the network N in the information processing apparatus 1. As an example of the non-volatile storage medium, a Compact Disc-Read Only Memory (CD-ROM), a magneto-optical disk, an HDD, a Digital Versatile Disc-Read Only Memory (DVD-ROM), a flash memory, a memory card, or the like is assumed.

The storage unit 15 also stores a database 15D containing various information that can be used in the information processing apparatus 1. The information for storing the database 15D is not limited to being stored in advance in the storage unit 15. For example, the information may be stored in an external device (not shown) and acquired from an external device (not shown) via a communication line.

The database 15D also stores an image function program 15S for simulating various functions of an image forming process in the image forming apparatus 2. The CPU, which is a predetermined execution device, reads the image function program 15S, and expands the image function program 15S into a memory, such as the RAM, to execute the process based on the settings. Therefore, the execution device which has executed the image function program 15S can operate the various functions by the image forming process such that simulation is possible.

In addition, the database 15D also stores verification data 15X (FIG. 7) used in a case of simulating the various functions of the image forming process in the image forming apparatus 2. In a case where the functions of the image forming apparatus are simulated by executing the process of the image function program 15S by the CPU of the execution device using the verification data 15X, it is possible to verify the function of the image forming apparatus.

The communication unit 17 is connected to the network N and is configured to be able to perform communication between the information processing apparatus 1 and the external device.

The operation input unit 18 is provided with an operation input device such as a keyboard or a mouse.

For example, a Liquid Crystal Display (LCD), an organic Electroluminescence (EL) display, or the like is used for the display unit 19. A touch panel having a function of the operation input unit 18 may be applied for the display unit 19. The operation input unit 18 and the display unit 19 accept various instructions from the user of the information processing apparatus 1. The display unit 19 displays various information such as the result of the process executed in response to the instruction accepted from the user and the notification for the process.

Figure 3:
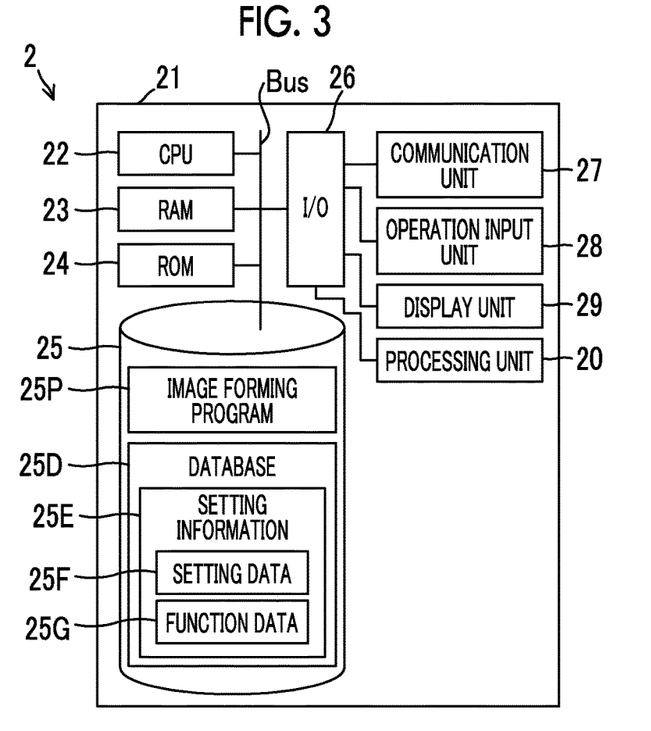
FIG. 3 is a diagram showing an example of an electrical schematic configuration of an image forming apparatus according to an exemplary embodiment.

Next, an example of a configuration of the image forming apparatus 2 will be described with reference to FIG. 3. FIG. 3 is a diagram showing an example of an electrical schematic configuration of the image forming apparatus 2 according to the present exemplary embodiment.

The image forming apparatus 2 includes a computer main body 21. The computer main body 21 includes a CPU 22, a RAM 23, a ROM 24, a storage unit 25, and an I/O 26. The CPU 22, the RAM 23, the ROM 24, the storage unit 25, and the I/O 26 are connected to each other via a bus Bus.

The I/O 26 is connected to respective functional units including a communication unit 27 that enables communication with an external device, an operation input unit 28 that enables operation input by the user, and a display unit 29 that enables image display. Each of the functional units can communicate with the CPU 22 via the I/O 26.

Further, the I/O 26 is connected to a processing unit 20 that physically executes various functions, such as the above-described copy function, regarding image formation. The processing unit 20 executes an actual image forming process.

The storage unit 25 stores an image forming program 25P for causing the image forming apparatus 2 to function. The CPU 22 reads the image forming program 25P from the storage unit 25, and expands image forming program 25P into the RAM 23 to execute the image forming process. As a result, the image forming apparatus 2 that has executed the image forming program 25P can execute various processes related to image formation.

The storage unit 25 also stores a database 25D containing various information that can be used in the image forming apparatus 2. The database 25D also stores setting information 25E related to the image forming process in the image forming apparatus 2. The setting information 25E contains setting data 25F and function data 25G. The setting data 25F indicates a setting value applied for a function executed in the image forming apparatus 2. The function data 25G indicates a setting value, such as the type of a function that can be executed by the image forming apparatus 2, related to equipment. By reflecting the setting data 25F in another image forming apparatus, it is possible to simulate the function of the image forming apparatus 2. By reflecting the configuration of the function data 25G in another image forming apparatus, it is possible to simulate the function provided in the image forming apparatus 2. The setting information 25E can be used as one data without distinguishing between the setting data 25F and the function data 25G. For example, it is also possible to include the function data 25G indicating the presence or absence of a specific function in the setting data 25F and use the function data 25G as the setting information 25E. In the image forming apparatus 2, the CPU 22 executes the image forming program 25P using the setting information 25E, so that the image forming process is executed in the processing unit 20.

The communication unit 27 is connected to the network N and is configured to be able to communicate with an external device. The operation input unit 28 accepts various instructions from the user of the image forming apparatus 2, and the display unit 29 displays various information such as the result of the process executed in response to the instruction accepted from the user and the notification for the process.

Figure 4:
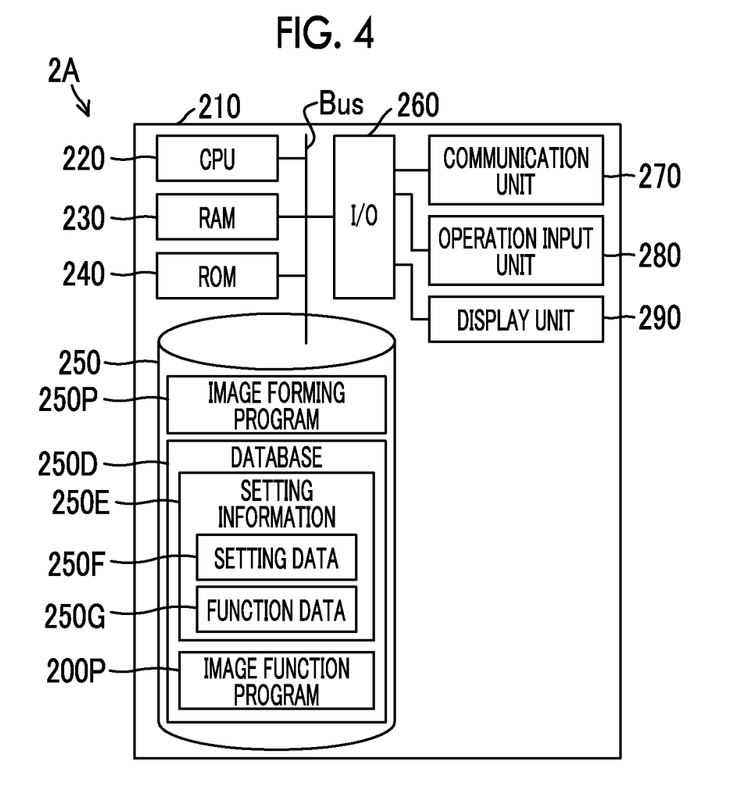
FIG. 4 is a diagram showing an example of an electrical schematic configuration of a virtual image forming apparatus according to an exemplary embodiment.

Next, an example of a configuration of the image forming apparatus 2A will be described with reference to FIG. 4. FIG. 4 is a diagram showing an example of an electrical schematic configuration of the virtual image forming apparatus 2A existing in the cloud network.

Similar to the image forming apparatus 2, the image forming apparatus 2A includes a computer main body 210, and the computer main body 210 includes a CPU 220, a RAM 230, a ROM 240, a storage unit 250, and an I/O 260, which are connected to each other via a bus Bus. A communication unit 270, an operation input unit 280, and a display unit 290 are connected to the I/O 260.

The storage unit 250 stores an image forming program 250P similar to the image forming program 25P.

Further, the storage unit 250 stores the database 250D similar to the image forming apparatus 2. The database 250D stores setting information 250E including setting data 250F and function data 250G.

Since the image forming apparatus 2A is an object constructed in the cloud network 3, Since the image forming apparatus 2A is not equipped with the processing unit 20 shown in FIG. 3. The image forming apparatus 2A stores the image function program 200P in the storage unit 250, instead of the processing unit 20. The image function program 200P can acquire and store the image function program 15S stored in the information processing apparatus 1. The image forming apparatus 2A executes the image function program 200P in a case where the CPU 220 executes the image forming program 250P using the setting information 250E, so that the image forming process can be performed by simulating the processing unit 20.

Figure 5:
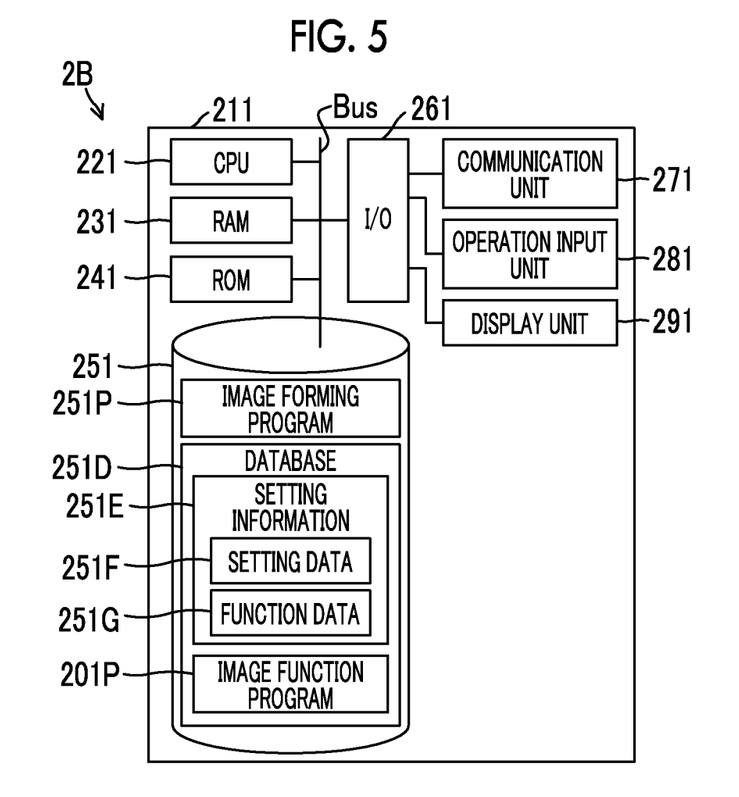
FIG. 5 is a diagram showing an example of an electrical schematic configuration of a virtual image forming apparatus according to an exemplary embodiment.

Next, an example of a configuration of the image forming apparatus 2B will be described with reference to FIG. 5. FIG. 5 is a diagram showing an example of an electrical schematic configuration of the virtual image forming apparatus 2B that can be constructed in a cloud network.

The image forming apparatus 2B is constructed by duplicating the image forming apparatus 2A. The image forming apparatus 2B includes a computer main body 211 similar to the image forming apparatus 2A. The computer main body 211 includes a CPU 221, a RAM 231 and a ROM 241, a storage unit 251 and an I/O 261, which are connected to each other via a bus Bus. A communication unit 271, an operation input unit 281 and a display unit 291 are connected to the I/O 261.

The storage unit 251 stores an image forming program 251P and a database 251D similar to the image forming program 250P. The database 251D stores setting information 251E which is obtained by copying the setting information 250E and includes setting data 251F and function data 251G.

Further, the image forming apparatus 2B stores the duplicated image function program 201P in the storage unit 251.

Figure 6:
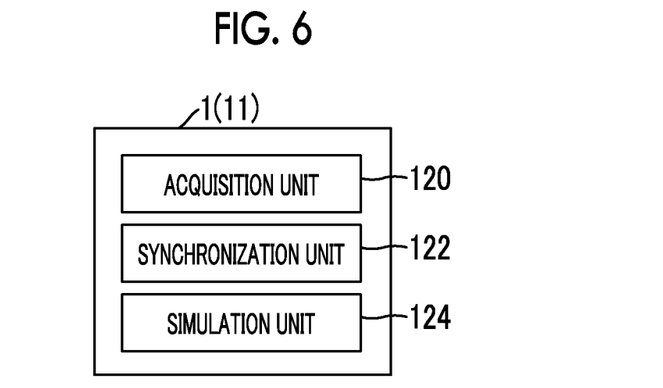
FIG. 6 is a diagram showing an example of a functional configuration of the information processing apparatus according to the exemplary embodiment.

Next, a functional configuration of the information processing apparatus 1 will be described with reference to FIG. 6. FIG. 6 is a diagram showing an example of a functional configuration of the information processing apparatus 1 according to the present exemplary embodiment.

The information processing apparatus 1 includes an acquisition unit 120, a synchronization unit 122, and a simulation unit 124. In a case where the CPU 12 of the information processing apparatus 1 executes the information processing program 15P, the information processing apparatus 1 functions as the acquisition unit 120, the synchronization unit 122, and the simulation unit 124.

The acquisition unit 120 is a functional unit that performs control to acquire a plurality of objects indicating the virtual image forming apparatuses capable of simulating the process which is generated by using the setting information set in a predetermined image forming apparatus and is executed in the image forming apparatus. Specifically, the acquisition unit 120 acquires the virtual image forming apparatuses 2A and 2B (a plurality of objects) generated by using the setting information 25E set in the image forming apparatus 2.

The plurality of objects may be generated by duplicating the setting information 25E set in the image forming apparatus 2. The acquisition unit 120 can acquire a first object obtained by duplicating the image forming apparatus 2, duplicate the acquired first object, and acquire a duplicated duplication object as a second object. For example, the acquisition unit 120 can acquire the virtual image forming apparatus 2A obtained by duplicating the image forming apparatus 2, duplicate the acquired virtual image forming apparatus 2, and acquire the duplicated virtual image forming apparatus as the virtual image forming apparatus 2B.

The synchronization unit 122 is a functional unit that performs control to synchronize setting information between the first object among the plurality of objects and the image forming apparatus. For example, the synchronization unit 122 performs control to synchronize the setting information 25E and 250E between the actual image forming apparatus 2 and the virtual image forming apparatus 2A.

The simulation unit 124 is a functional unit that performs control to simulate the process executed by the image forming apparatus by using the second object different from the first object. Specifically, the simulation unit 124 performs control to cause the virtual image forming apparatus 2B to simulate the process executed by the actual image forming apparatus 2. The simulation unit 124 can perform control to verify the process by performing control to cause the virtual image forming apparatus 2B to simulate the process executed by the image forming apparatus 2 by using predetermined information. In the control to verify the process, it is possible to use predetermined verification data.

Figure 7:
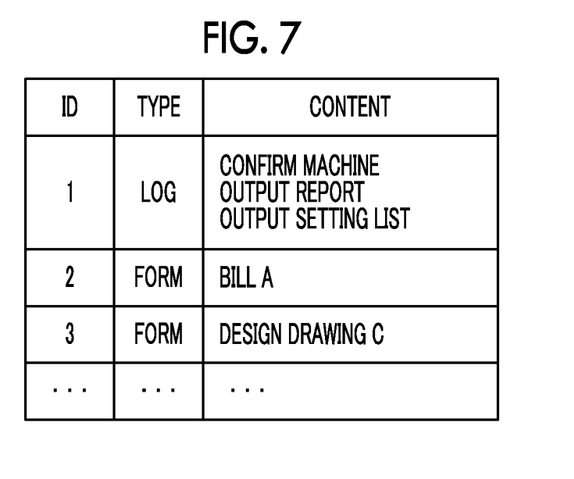
FIG. 7 is a diagram showing an example of verification data according to an exemplary embodiment.

FIG. 7 is a diagram showing an example of the verification data used in a case of performing control to verify the process.

History data, such as user operation logs, and image data, such as forms for printing, are mentioned as the verification data. Data, which stores the history data in a case where the process is executed by the function of the image forming apparatus 2, can be applied to the history data. For example, it is possible to store detailed history data of the settings of the image forming apparatus 2 at the time of function operation, a request via the network to the image forming apparatus 2 (print data, information request, request source application information, request source Operating System (OS) information, or the like), user interface operation, an output result (scan data, information response data, destination application information, destination OS information, or the like), and use the history data for the verification data. The verification data can be stored in the database 15D in the storage unit 15 of the information processing apparatus 1. The verification data may be acquired from the image forming apparatus 2, or data may be created in advance and then stored. Further, the verification data is not limited to being stored in the information processing apparatus 1. For example, the verification data, which is accumulated in the image forming apparatus 2 or an external device (not shown), and the accumulated verification data may be acquired via the network N.

The acquisition unit 120 described above can acquire instruction information indicating a change instruction for the setting information 25E of the actual image forming apparatus 2. In a case where the instruction information is acquired by the acquisition unit 120, the simulation unit 124 can reflect the change due to the instruction information in the virtual image forming apparatus 2B. The simulation unit 124 is the virtual image forming apparatus 2B on which the change is reflected, and simulates the process executed by the image forming apparatus 2. Then, the simulation unit 124 can acquire the verification result of the process in the virtual image forming apparatus 2B on which the change is reflected. The simulation unit 124 can determine whether the setting information is reflected in the actual image forming apparatus 2 based on the verification result. That is, in a case of the verification result indicating the appropriateness of the process in the image forming apparatus 2, it is possible to perform control to reflect the setting information 250E of the virtual image forming apparatus 2A, which is the same as the setting information 251E obtained by reflecting the instruction information in the virtual image forming apparatus 2B, in the setting information 25E of the image forming apparatus 2. On the other hand, in a case of a verification result indicating inappropriateness of the process, it is possible to perform control to output information indicating that the instruction information is inappropriate to the process.

It is possible to temporarily store the setting information before reflecting the change due to the above-described instruction information in the setting information 250E of the virtual image forming apparatus 2A. In a case where the change due to the above-described instruction information is reflected in the setting information 250E of the virtual image forming apparatus 2A and the verification result indicates that the process is inappropriate, it is possible to perform control to return the setting information 250E of the virtual image forming apparatus 2A to the stored setting information. That is, in a case where the virtual image forming apparatus 2A synchronized with the image forming apparatus 2 is inappropriate in a case where the process is simulated, the setting information can be restored before the change.

After the above-described process is verified, the simulation unit 124 can confirm the change in the virtual image forming apparatus 2A before and after the verification. Based on the confirmation result of the change in the virtual image forming apparatus 2A, it is also possible to perform control to determine whether or not to perform verification for the change in the virtual image forming apparatus 2A before and after the verification.

In this case, in a case where the virtual image forming apparatus 2A is changed before and after the verification, the simulation unit 124 can further control to cause the virtual image forming apparatus 2B to verify the process for the change in the virtual image forming apparatus 2A.

Since the virtual image forming apparatus 2B described above becomes unnecessary after the verification of the process, perform control to erase the virtual image forming apparatus 2B may be performed after control to verify the process.

By using the information processing apparatus 1 and the virtual image forming apparatuses 2A and 2B, which have the above-described configuration, for the process executed by the image forming apparatus 2 installed in the actual environment, the settings during the simulation can be reflected in the actual image forming apparatus even during the simulation performed by the virtual image forming apparatus 2A.

Next, an operation of the information processing apparatus 1 according to the present exemplary embodiment will be described. In the present exemplary embodiment, a case where the function settings related to an electronic mail (hereinafter, simply referred to as a mail), which can be transmitted and received in the image forming apparatus 2, is changed by the user will be described.

Figure 8:
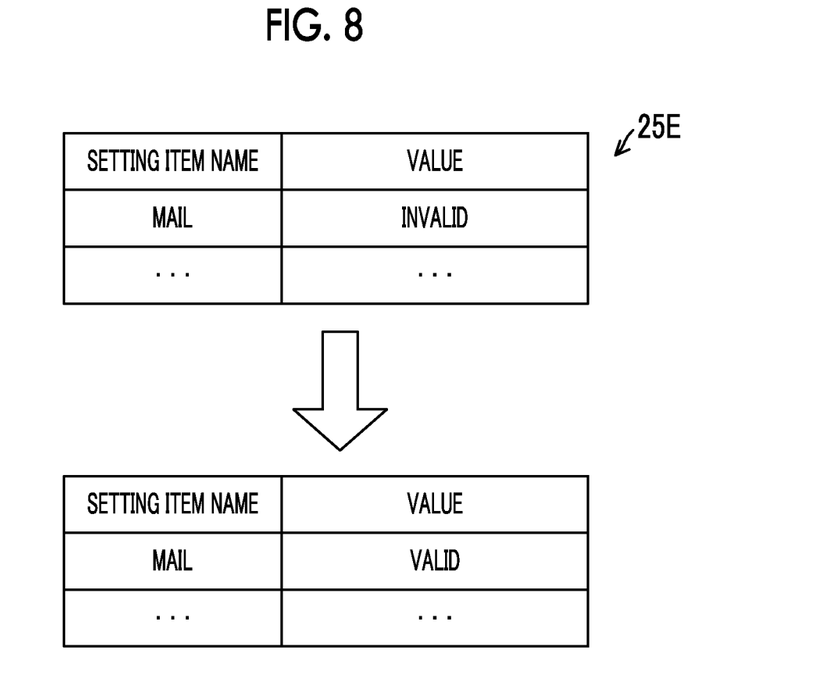
FIG. 8 is a diagram showing an example in a case where setting information according to the exemplary embodiment is changed.

FIG. 8 is a diagram showing an example of a case where the setting information 25E (the setting data 25F and the function data 25G) in the image forming apparatus 2 is changed. In FIG. 8, the mail setting in the setting information 25E (the setting data 25F and the function data 25G) is changed from "invalid" to "valid".

Figure 9:
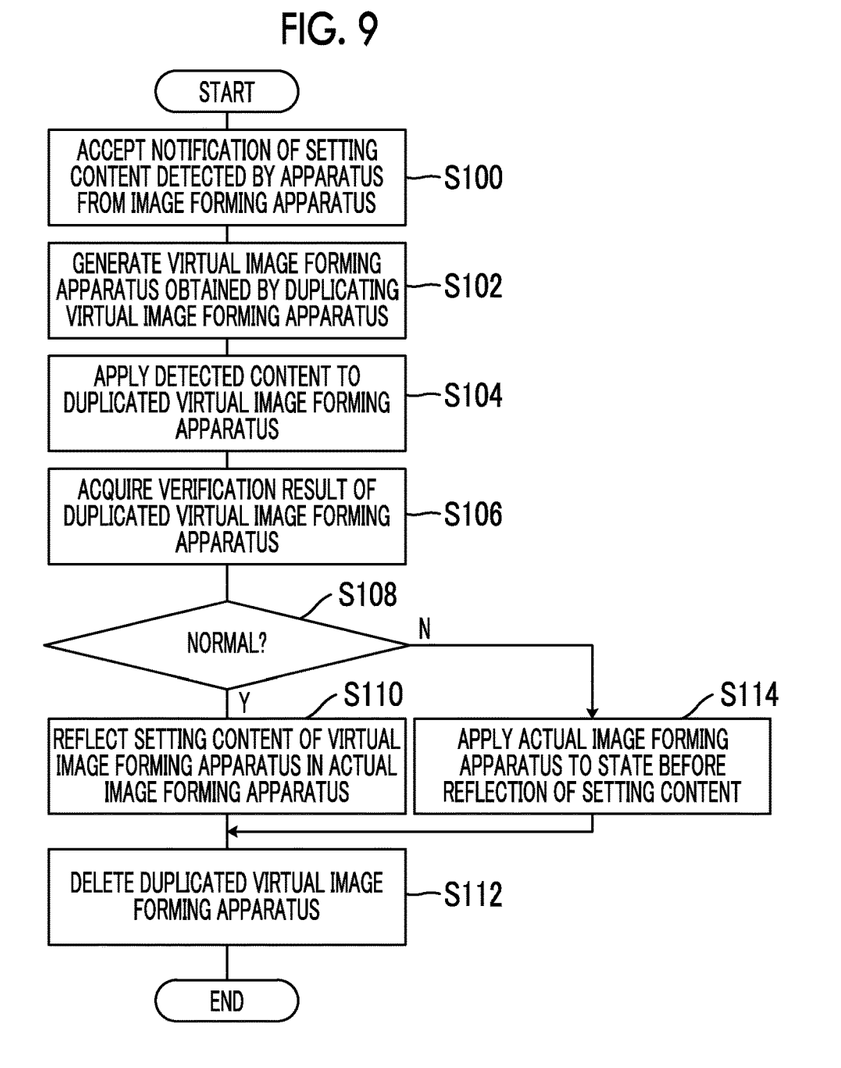
FIG. 9 is a flowchart showing an example of a flow of processing by an information processing program according to an exemplary embodiment.

FIG. 9 is a flowchart showing an example of a flow of processing by the information processing program 15P executed in the information processing apparatus 1 according to the present exemplary embodiment.

First, in a case where the information processing apparatus 1 is instructed to start the information processing program 15P, the CPU 12 executes each of the following steps. The information processing program 15P is started on the assumption that the start is instructed by a periodical execution instruction or acquisition of a notification from the image forming apparatus 2. In the present exemplary embodiment, it is assumed that the start is instructed by the acquisition of the notification from the image forming apparatus 2.

Here, it is assumed that the virtual image forming apparatus 2A that stores the settings of the actual image forming apparatus 2 is connected to the network N, and the virtual image forming apparatus 2B that stores the settings of the image forming apparatus 2 is not formed or connected to the network N. Further, it is assumed that the actual image forming apparatus 2 and the virtual image forming apparatus 2A are synchronized with each other, that is, the setting information 25E and the setting information 250E are synchronized with each other. Further, the virtual image forming apparatus 2A can store the information before and after the change of the setting information 250E as a history.

First, in step S100, the CPU 12 accepts a notification of setting content detected by the image forming apparatus 2 from the image forming apparatus 2. Specifically, the user instructs the image forming apparatus 2 to change the mail setting from invalid to valid. As a result, the image forming apparatus 2 notifies the information processing apparatus 1 that the setting content of the setting information 25E in the image forming apparatus 2 is changed. In response to this, the CPU 12 of the information processing apparatus 1 starts the information processing program 15P, and in step S100, accepts the setting content detected by the image forming apparatus 2, that is, a notification of the instruction to change the mail setting from invalid to valid. At this point, the setting for changing the mail setting for the actual image forming apparatus 2 is not reflected. Further, the virtual image forming apparatus 2A synchronized with the actual image forming apparatus 2 is not reflected with the setting for changing the mail setting.

In step S102, the CPU 12 generates the virtual image forming apparatus 2B obtained by duplicating the virtual image forming apparatus 2A. At this point, the virtual image forming apparatus 2B is connected to the network N as the image forming apparatus which is the same as the virtual image forming apparatus 2A.

In step S104, the CPU 12 applies the content of the accepted notification to the duplicated virtual image forming apparatus 2B. Specifically, the CPU 12 notifies the image forming apparatus 2B that the mail setting has been changed to valid, and performs control to change a mail setting value from invalid to valid in the setting information 251E of the duplicated virtual image forming apparatus 2B. The image forming apparatus 2B, which has received the notification, changes the mail setting from invalid to valid.

In step S106, the CPU 12 acquires a verification result of the duplicated virtual image forming apparatus 2B. Specifically, first, the image forming apparatus 2B acquires the verification data, such as the operation logs and the forms, from the information processing apparatus 1. The verification data may be automatically output from the information processing apparatus 1 in step S104, or may be output at the request of the image forming apparatus 2B. Next, the CPU 12 requests the image forming apparatus 2B to execute the verification. In response to this, the image forming apparatus 2B executes the past operation and process in the actual image forming apparatus 2 using the operation logs of the acquired verification data. Further, the image forming apparatus 2B virtually outputs the forms of the acquired verification data. The image forming apparatus 2B determines whether the execution results of the past operation and process and the virtual output result of the forms are the predetermined normal execution results and the output result. The determination result is output to the information processing apparatus 1. The determination result output from the image forming apparatus 2B is acquired in step S106.

The verification result may be determined by the information processing apparatus 1 or may be determined by a verification server (not shown). In this case, the image forming apparatus 2B may output the execution results of the past operation and process and data of the virtually output virtual forms to the information processing apparatus 1 or the verification server (not shown). Then, the information processing apparatus 1 or the verification server (not shown) may determine whether or not the predetermined normal execution result and output result, and may acquire the determination result as the verification result.

In step S108, the CPU 12 determines whether or not the acquired verification result is normal, and, in a case where the verification result is normal, a positive determination is made, and proceeds to the process in step S110.

In step S110, the CPU 12 reflects the setting content of the virtual image forming apparatus 12B in the actual image forming apparatus 2. Specifically, in a case where a normal verification result is acquired, the image forming apparatus 2B notifies the image forming apparatus 2A of the verification result. The image forming apparatus 2A reflects the setting information 250E in the content of the notification accepted from the image forming apparatus 2 by changing the setting value of the mail from invalid to valid as a response of the notified verification result. Then, by synchronizing the setting information 250E of the image forming apparatus 2A and the setting information 25E of the image forming apparatus 2, the content of changing the mail setting from invalid to valid is reflected in the image forming apparatus 2.

Next, the CPU 12 ends the present processing routine after performing control to delete the duplicated virtual image forming apparatus 2B in step S112.

On the other hand, in a case where a negative determination is made in step S108, the CPU 12 proceeds to the process in step S114 and applies the setting content of the actual image forming apparatus 2 so as to be in a state before the reflection of the setting content. Specifically, in a case where an abnormal verification result that is not normal is acquired, the image forming apparatus 2B notifies the image forming apparatus 2A of the verification result. The image forming apparatus 2A considers that it is inappropriate to change the setting value of the mail from invalid to valid as the response of the notified verification result, and discards the content of the accepted notification without reflecting the setting information 250E in the content of the notification accepted from the image forming apparatus 2. Then, by synchronizing the setting information 250E of the image forming apparatus 2A and the setting information 25E of the image forming apparatus 2, the content of changing the mail setting from invalid to valid is not reflected on the image forming apparatus 2.

In the above, a case has been described where the setting for changing the mail setting for the actual image forming apparatus 2 is not reflected and the setting is not reflected in the virtual image forming apparatus 2A synchronized with the actual image forming apparatus 2. On the other hand, the present exemplary embodiment can be applied to a case where the notification is given after the mail settings are changed in the actual image forming apparatus 2 or a case where the virtual image forming apparatus 2A is synchronized. In this case, the history stored in the virtual image forming apparatus 2A described above, that is, the information before and after the change of the setting information 250E may be used. Specifically, in the case of the normal verification result, the image forming apparatus 2A may reflect the setting information 250E that maintains the set value of the changed mail (step S110). On the other hand, in the case of the abnormal verification result that is not normal, the image forming apparatus 2A may restore the setting information 250E to the stored information in a state before the change (setting information 250E). Then, by synchronizing the restored setting information 250E of the image forming apparatus 2A and the setting information 25E of the image forming apparatus 2, the image forming apparatus 2 is put into an invalid state before the mail setting is changed to valid (step S114).

Second Exemplary Embodiment

Next, a second exemplary embodiment will be described. Since the second exemplary embodiment has the same configuration as the first exemplary embodiment, the identical parts are designated by the identical reference numerals and detailed description thereof will be omitted. In addition, in the second exemplary embodiment, a part different from the first exemplary embodiment will be described.

In the first exemplary embodiment, a case has been described where the function setting related to the mail that can be transmitted and received in the image forming apparatus 2 is changed by the user. In the second exemplary embodiment, a case will be described where, for the change of the setting content for the image forming apparatus 2, the central device (not shown) that manages the image forming apparatus 2 requests to change the setting content.

In the second exemplary embodiment, as an example of changing the setting content, a case where the OS is upgraded by the OS information of the request to the image forming apparatus 2 via the network will be described. Further, in the second exemplary embodiment, a case where the content information for upgrading the OS is transmitted from the central device (not shown) to the virtual image forming apparatus 2A will be described as an example.

Next, an operation of the information processing apparatus 1 according to the second exemplary embodiment will be described.

In the information processing according to the second exemplary embodiment, first, the CPU 12 accepts a request to upgrade the OS of the image forming apparatus 2 from the central device (not shown), and generates the virtual image forming apparatus 2B. Specifically, the virtual image forming apparatus 2A detects the request to upgrade the OS of the image forming apparatus 2, and the virtual image forming apparatus 2A provides a notification that the request to upgrade the OS of the image forming apparatus 2 is detected to the information processing apparatus 1. In response to this, the CPU 12 of the information processing apparatus 1 accepts the detected setting content (step S100) and generates a virtual image forming apparatus 2B obtained by duplicating the virtual image forming apparatus 2A (step S102).

Next, the CPU 12 applies the content of upgrading the OS to the duplicated virtual image forming apparatus 2B (step S104), and acquires the verification result of the duplicated virtual image forming apparatus 2B (step S106). Specifically, the CPU 12 acquires the verification data, such as the operation logs and the forms, and requests the image forming apparatus 2B to execute the verification. The image forming apparatus 2B executes the past operation and process based on the operation logs of the verification data, and virtually outputs the forms of the verification data, thereby determining whether the execution result and the output result are the normal execution result and the output result. The determination result is acquired by the information processing apparatus 1.

In a case where the acquired verification result is normal (positive in step S108), the CPU 12 reflects the setting content of the virtual image forming apparatus 12B in the actual image forming apparatus 2 (step S110). Specifically, in the case of the normal verification result, the image forming apparatus 2B notifies the image forming apparatus 2A of the verification result, and the image forming apparatus 2A changes the set value of the OS information to a version upgrade value so that the setting information 250E is reflected in the content of the accepted notification. Then, the setting information 250E of the image forming apparatus 2A and the setting information 25E of the image forming apparatus 2 are synchronized with each other.

In a case where the acquired verification result is not normal (negative in step S108), the CPU 12 notifies the central device (not shown) that the content for upgrading the OS is inappropriate (step S114). Specifically, in a case where the verification result is not normal, the image forming apparatus 2B notifies the image forming apparatus 2A of the verification result, and the image forming apparatus 2A considers that it is inappropriate to upgrade the requested OS and notifies the central device (not shown) of the verification result without reflecting the setting information 250E in the content of the accepted request.

Then, the CPU 12 performs control to delete the duplicated virtual image forming apparatus 2B (step S112).

In the above description, a case has been described where the request to upgrade the OS of the image forming apparatus 2 is transmitted from the central device (not shown) to the virtual image forming apparatus 2A. The present exemplary embodiment is not limited to the request transmitted from the central device (not shown). For example, the present exemplary embodiment can be applied to a case where the user instructs the image forming apparatus 2 to perform setting (a request to upgrade the OS).

As described above, according to the present exemplary embodiment, in a case where an external device, such as a central device, instructs to change the setting for the image forming apparatus 2, verification for the setting to be changed is performed in the duplicated virtual image forming apparatus 2B before changing the setting. Therefore, it is possible to previously grasp a problem caused by changing the setting of the actual image forming apparatus 2, so that it is possible to reduce the load on the user without hindering the process of the image forming apparatus 2 due to the problem caused by the change in the setting.

Third Exemplary Embodiment

Next, a third exemplary embodiment will be described. Since the third exemplary embodiment has the same configuration as the above-described exemplary embodiment, the identical parts are designated by the identical reference numerals and detailed description thereof will be omitted. In addition, in the third exemplary embodiment, a part different from the above-described exemplary embodiment will be described.

The third exemplary embodiment is a modification example of the first exemplary embodiment. Specifically, as the change of the setting content for the image forming apparatus 2, a case will be described where a change of the setting content for adding a subprogram, such as an application program and a plug-in program that can be executed by the image forming apparatus 2, is requested. The third exemplary embodiment is different from the first exemplary embodiment in that the subprogram is added in addition to the change of the setting information 25E of the image forming apparatus 2.

Next, an operation of the information processing apparatus 1 according to the third exemplary embodiment will be described.

In the information processing according to the third exemplary embodiment, the CPU 12 accepts a request to add the subprogram to the image forming apparatus 2, acquires the content of the subprogram (step S100), and generates the image forming apparatus 2B obtained by duplicating the image forming apparatus 2A (step S102).

Next, the CPU 12 applies the content of adding the subprogram to the image forming apparatus 2 to the duplicated virtual image forming apparatus 2B (step S104), and acquires the verification result of the duplicated virtual image forming apparatus 2B (step S106). Then, in a case where the verification result is normal (positive in step S108), the setting content of the virtual image forming apparatus 12B is reflected in the actual image forming apparatus 2 (step S110). On the other hand, in a case where the verification result is not normal (negative in step S108), the CPU 12 applies the setting content of the actual image forming apparatus 2 so as to be in a state before the reflection of the setting content (step S114). Here, it is notified that the content of adding the subprogram is inappropriate. Then, the CPU 12 performs control to delete the duplicated virtual image forming apparatus 2B (step S112).

Fourth Exemplary Embodiment

Next, a fourth exemplary embodiment will be described. Since the fourth exemplary embodiment has the same configuration as the above-described exemplary embodiment, the identical parts are designated by the identical reference numerals and detailed description thereof will be omitted. Further, in the fourth exemplary embodiment, a part different from the above-described exemplary embodiment will be described.

In the fourth exemplary embodiment, in a case where a verification result is inappropriate, the inappropriate setting content is registered in the database 15D of the information processing apparatus 1 as a setting change prohibition list 15H. In a case where the identical or similar setting content is changed, warning information is output.

Figure 10:
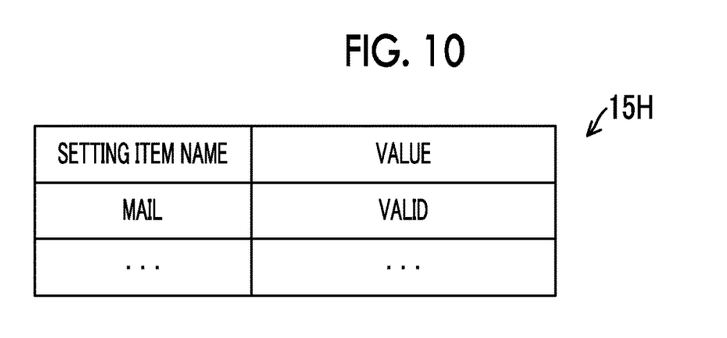
FIG. 10 is a diagram showing an example of a setting change prohibition list according to an exemplary embodiment.

FIG. 10 is a diagram showing an example of the setting change prohibition list 15H registered in the database 15D of the information processing apparatus 1. FIG. 10 shows an example of a case where the verification result is inappropriate in a case where the mail setting is "valid" in the setting of the image forming apparatus 2.

Next, an operation of the information processing apparatus 1 according to the fourth exemplary embodiment will be described.

Figure 11:
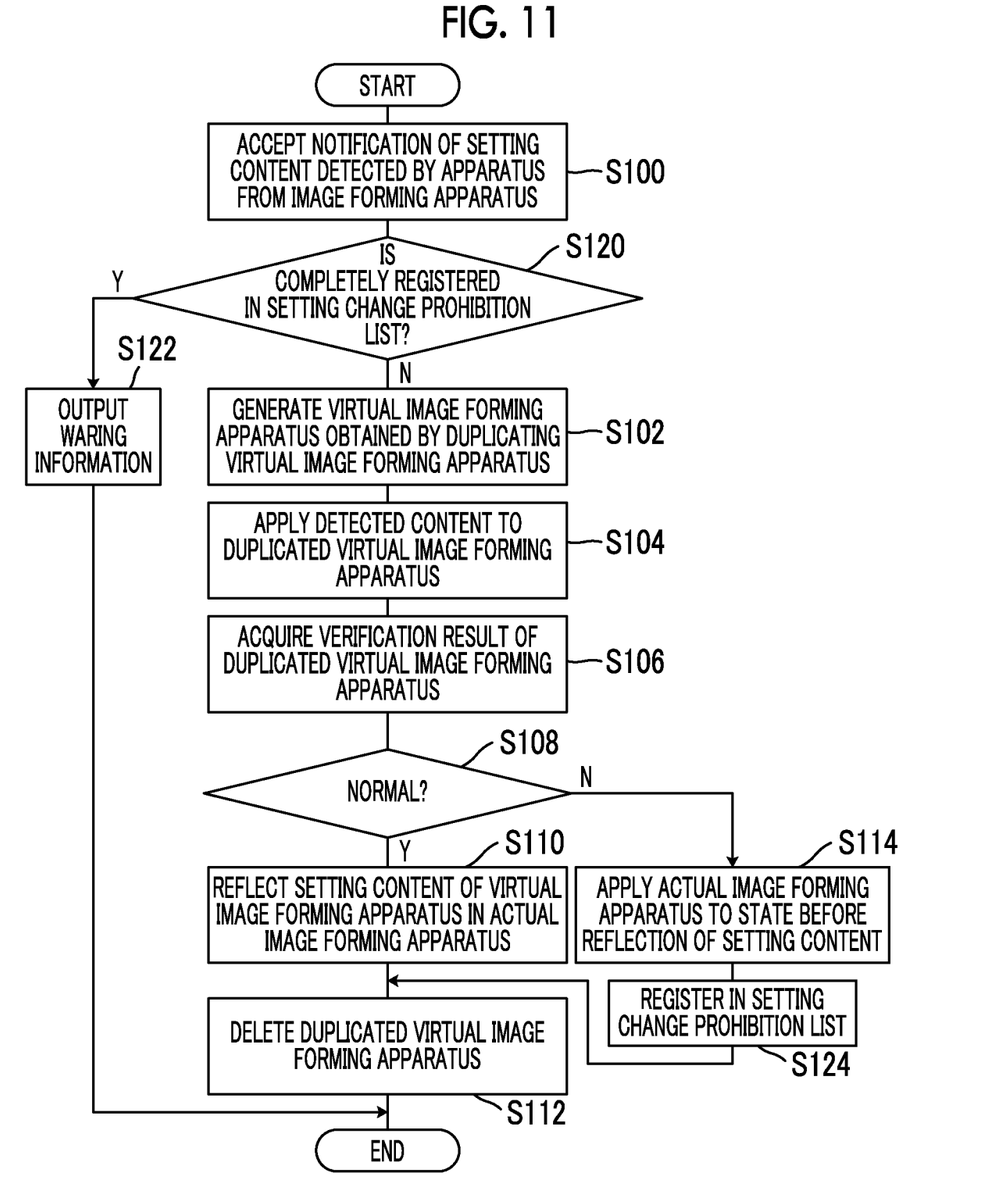
FIG. 11 is a flowchart showing an example of a flow of processing by an information processing program according to an exemplary embodiment.

FIG. 11 is a flowchart showing an example of a flow of processing by the information processing program 15P executed in the information processing apparatus 1 according to the present exemplary embodiment. In the process shown in FIG. 11, processes in steps S120, S122, and S124 are added to the process shown in FIG. 9.

In the information processing according to the fourth exemplary embodiment, in a case where the CPU 12 accepts the notification of the setting content (step S100), the CPU 12 determines whether or not the accepted setting content is registered in the setting change prohibition list 15H in step S120. In a case where a positive determination is made in step S120, the warning information for warning that the instructed setting content is inappropriate to the image forming apparatus 2 is output in step S122, and the present processing routine ends. On the other hand, in a case where a negative determination is made in step S120, the process proceeds to the process of generating the virtual image forming apparatus 2B described above (step S102).

Further, in the present exemplary embodiment, in a case where the verification result of the instructed setting content is inappropriate (negative in step S108), the CPU 12 applies the setting content of the actual image forming apparatus 2 so as to be in the state before the reflection of the setting content (step S114). Here, it is notified that the setting content is inappropriate. Then, in the added step S124, the inappropriate setting content is registered in the setting change prohibition list 15H, and the process proceeds to step S112.

As described above, according to the present exemplary embodiment, in a case where the setting to be reflected in the image forming apparatus 2 is inappropriate, the inappropriate setting content is registered in the setting change prohibition list 15H. Further, in a case where the setting content to be reflected in the image forming apparatus 2 is already registered in the setting change prohibition list 15H, the warning information is output. Therefore, by referring to the setting change prohibition list 15H, it is possible to present a warning for inappropriate setting content without executing the above-described verification.

Fifth Exemplary Embodiment

Next, a fifth exemplary embodiment will be described. Since the fifth exemplary embodiment has the same configuration as the above-described exemplary embodiment, the identical parts are designated by the identical reference numerals and detailed description thereof will be omitted. Further, in the fifth exemplary embodiment, a part different from the above-described exemplary embodiment will be described.

In the fifth exemplary embodiment, in a case where the inappropriate setting content, which is registered in the setting change prohibition list 15H in a case where the verification result is inappropriate, is determined to be normal by re-verification, the inappropriate setting content is excluded from the setting change prohibition list 15H.

Next, an operation of the information processing apparatus 1 according to the fifth exemplary embodiment will be described.

Figure 12:
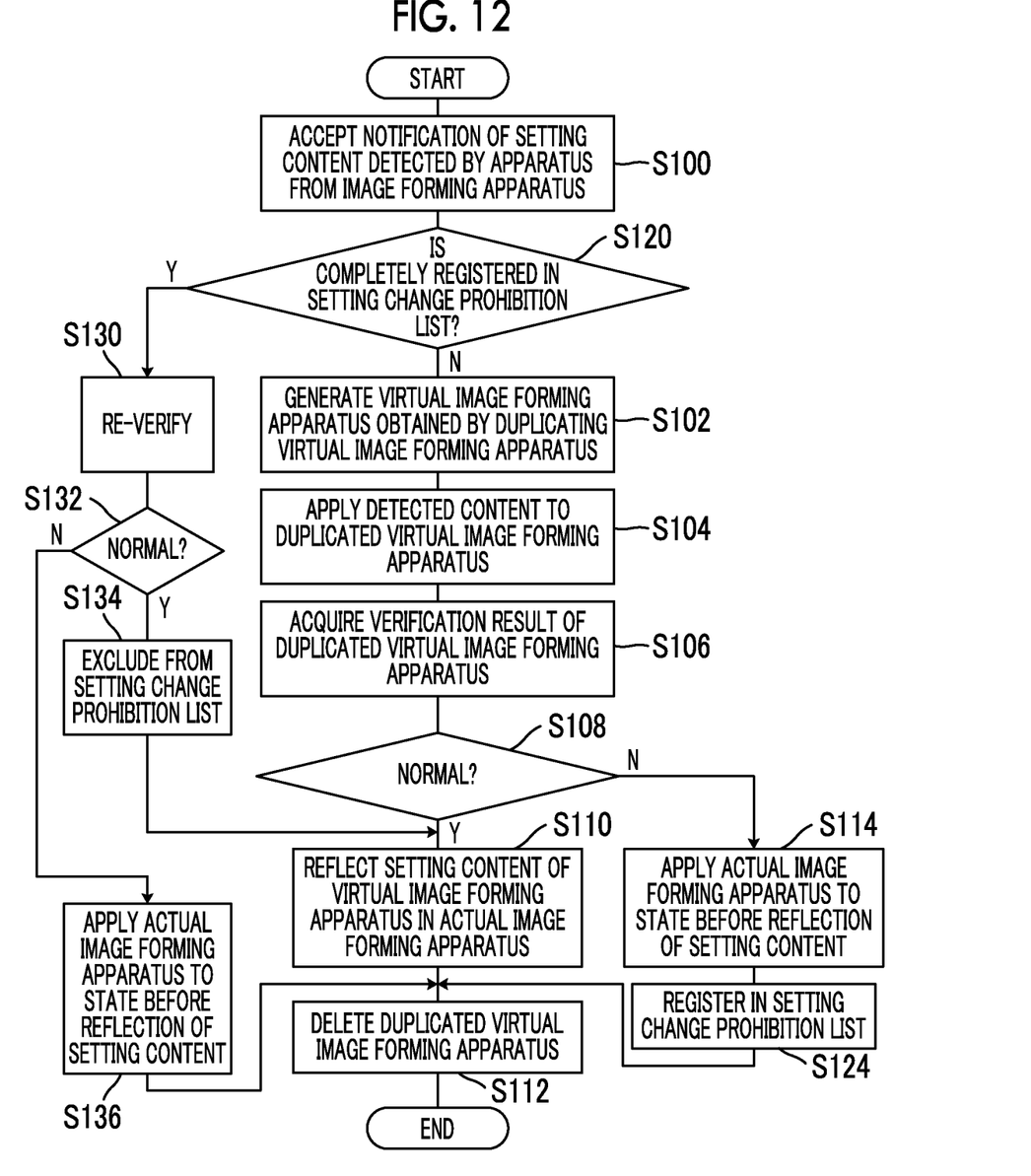
FIG. 12 is a flowchart showing an example of a flow of processing by an information processing program according to an exemplary embodiment.

FIG. 12 is a flowchart showing an example of a flow of processing by the information processing program 15P executed in the information processing apparatus 1 according to the present exemplary embodiment. In the process shown in FIG. 12, the processes in steps S130, S132, S134, and S136 are added in place of the process in step S122 shown in FIG. 11.

In the information processing according to the fifth exemplary embodiment, in the case of the positive determination in step S120, the CPU 12 re-verifies the inappropriate setting contents in step S130. As for the process in step S130, the same process as in step S106 is executed from step S102. Next, in step S132, the CPU 12 determines whether or not the result of the re-verification is normal, and in a case of the positive determination, shifts the process to step S134. In step S134, the setting content for which the result of the re-verification is normal is excluded from the setting change prohibition list 15H, and the process proceeds to step S110. On the other hand, in the case where a negative determination is made, similar to the above-described step S114, the setting content of the actual image forming apparatus 2 is applied so as to be in the state before the reflection of the setting content (here, notifies that re-verified content is inappropriate) in step S136, and the process proceeds to step S112.

As described above, according to the present exemplary embodiment, in a case where the verification result obtained by re-verifying the setting contents registered in the setting change prohibition list 15H is normal, the setting content is excluded from the setting change prohibition list 15H. Therefore, in a case where the inappropriate setting becomes normal, it is possible to exclude the setting from the setting change prohibition list 15H and to apply the setting to the image forming apparatus 2.

Other Exemplary Embodiments

In the above-described exemplary embodiment, a case has been described where the information processing apparatus 1 and the virtual image forming apparatus 2A are independently configured, but the present disclosure is not limited thereto. For example, the virtual information processing apparatus 1 may be formed in the cloud network 3, the virtual information processing apparatus 1 and the virtual image forming apparatus 2A may be formed in the cloud network 3, and the information processing apparatus 1 and the virtual image forming apparatus 2A may be integrally formed. In this case, the virtual image forming apparatus 2A may be configured to operate as the above-described information processing apparatus 1, or the virtual image forming apparatus 2A may be operated in the information processing apparatus 1.

In the above-described exemplary embodiment, a case has been described where the setting information of the image forming apparatus is changed or specified. However, in a case where the instructed setting content is inappropriate, there is a case where the instructed setting content changes to be normal by changing other setting information different from the instructed setting content. Therefore, in the above-described verification, a trial process for changing other setting information different from the instructed setting content may be performed. In a case where the instructed setting content becomes normal by the trial process, for example, the user preferably confirms the change of other different setting information, the change being made in the trial process. Specifically, in order to reflect the instructed setting content in the image forming apparatus 2, it is inquired whether or not to allow to change other different setting information. As a result, the user can confirm the change of other setting information that affects in a case where the instructed setting content is reflected in the image forming apparatus 2.

Further, in the above-described exemplary embodiment, a case has been described where the instruction of the setting for the image forming apparatus 2 is verified using the actual image forming apparatus 2, the virtual image forming apparatus 2A, and the virtual image forming apparatus 2B obtained by duplicating the virtual image forming apparatus 2A. The virtual image forming apparatus 2B is not limited to one, and the virtual image forming apparatus 2A may be duplicated in a plurality of virtual image forming apparatuses and processed in parallel. As a result, the verification load can be distributed, and the time required for the verification can be shortened as compared with the case where the verification is performed using only the image forming apparatus 2B.

Further, in the above-described exemplary embodiment, the setting content instructed to the actual image forming apparatus 2 and the verification result by the virtual image forming apparatus 2B based on the setting content can be used for other actual image forming apparatuses. For example, the setting contents and the verification result by the virtual image forming apparatus 2B based on the setting content can be used in common for the image forming apparatuses, which have the same configuration, like the image forming apparatus of the identical lot and the image forming apparatus of the identical model. As a result, by using the data (the setting content and the verification result) that have been verified in the past, it is possible to reduce the verification performed for each image forming apparatus and it is possible to reduce the processing load.

Further, in the above-described exemplary embodiment, a case has been described where the verification is performed using the verification data including the history data, such as the user operation logs, and the image data such as the forms for printing. As the verification data used for the verification, data predetermined for each image forming apparatus 2 may be used. For example, in a case where the image forming apparatus 2 is used as an image forming apparatus dedicated to printing the forms, only the verification data related to the form needs to be applied.

Further, the verification information of the setting content instructed to the actual image forming apparatus 2 described above and the verification result by the virtual image forming apparatus 2B based on the setting content may be accumulated in an accumulation device by acquiring information of a plurality of different image forming apparatuses. For example, the verification information accumulated in the accumulation device is preferably configured such that an extraction process by searching is possible. For example, it is possible to omit the verification process by creating the image forming apparatus and the setting content of the image forming apparatus and acquiring the verification result. Therefore, it is possible to reduce the processing load related to the verification.

Hereinabove, the information processing apparatus according to the exemplary embodiment has been illustrated. The exemplary embodiment may be in the form of a program for causing a computer to execute the function of each unit included in the information processing apparatus. The exemplary embodiment may be in the form of a storage medium that can be scanned by a computer that stores the program.

In addition, the configuration of the information processing apparatus described in the above exemplary embodiment is an example, and may be changed depending on a situation within a range that does not deviate from the gist.

Further, the flow of processing of the program described in the exemplary embodiment is also an example, and unnecessary steps may be deleted, new steps may be added, or processing order may be changed within the range that does not deviate from the gist of the invention.

Further, in the above exemplary embodiment, the case where the process according to the exemplary embodiment is realized by a software configuration using the computer by executing the program has been described, but the present disclosure is not limited thereto. The exemplary embodiment may be realized, for example, by a hardware configuration or a combination of the hardware configuration and the software configuration.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
acquire a plurality of objects indicating virtual image forming apparatuses generated by using setting information set in a predetermined image forming apparatus and capable of simulating a process executed by the image forming apparatus;
perform control to synchronize the setting information between a first object among the plurality of objects and the image forming apparatus; and
perform control to simulate the process executed by the image forming apparatus using a second object different from the first object,
wherein the processor is further configured to:
acquire the first object,
duplicate the acquired object and acquire the duplicated duplication object as the second object, and
perform control to verify the process by performing control to cause the second object to simulate the process executed by the image forming apparatus by using predetermined information.

2. The information processing apparatus according to claim 1, wherein the processor is configured to:
acquire instruction information indicating an instruction for the setting information with respect to the image forming apparatus, reflect a change due to the instruction information in the second object, and based on a verification result of the process in the second object in which the change is reflected, perform control to reflect the setting information, which is obtained by reflecting the instruction information in the first object, in the setting information of the image forming apparatus in a case of a verification result indicating appropriateness of the process in the image forming apparatus, and perform control to output information indicating that the instruction information is inappropriate to the process in a case of a verification result indicating inappropriateness of the process in the image forming apparatus.

3. The information processing apparatus according to claim 2, wherein the processor is configured to:

temporarily store setting information before the change due to the instruction information is reflected in the first object, and reflect the change due to the instruction information in the first object, and perform control to return the first object to the stored setting information in the case of the verification result indicating inappropriateness of the process.

4. The information processing apparatus according to claim 3, wherein the processor is configured to:

after verification of the process, confirm a change in the first object before and after the verification, and based on a confirmation result of the change in the first object, perform control to determine whether or not to verify the change in the first object before and after the verification.

5. The information processing apparatus according to claim 4, wherein the processor is configured to:

in a case where the first object is changed before and after the verification, further perform control to verify the process for the change in the first object.

6. The information processing apparatus according to claim 4, wherein the processor is configured to:

after performing control to verify the process, control to erase the second object.

7. The information processing apparatus according to claim 3, wherein the processor is configured to:

after performing control to verify the process, control to erase the second object.

8. The information processing apparatus according to claim 2, wherein the processor is configured to:

after verification of the process, confirm a change in the first object before and after the verification, and based on a confirmation result of the change in the first object, perform control to determine whether or not to verify the change in the first object before and after the verification.

9. The information processing apparatus according to claim 8, wherein the processor is configured to:

in a case where the first object is changed before and after the verification, further perform control to verify the process for the change in the first object.

10. The information processing apparatus according to claim 9, wherein the processor is configured to:

after performing control to verify the process, control to erase the second object.

11. The information processing apparatus according to claim 8, wherein the processor is configured to:

after performing control to verify the process, control to erase the second object.

12. The information processing apparatus according to claim 2, wherein the processor is configured to:

after performing control to verify the process, control to erase the second object.

13. The information processing apparatus according to claim 1, wherein the processor is configured to:

after verification of the process, confirm a change in the first object before and after the verification, and based on a confirmation result of the change in the first object, perform control to determine whether or not to verify the change in the first object before and after the verification.

14. The information processing apparatus according to claim 13, wherein the processor is configured to:

in a case where the first object is changed before and after the verification, further perform control to verify the process for the change in the first object.

15. The information processing apparatus according to claim 14, wherein the processor is configured to:

after performing control to verify the process, control to erase the second object.

16. The information processing apparatus according to claim 13, wherein the processor is configured to:

after performing control to verify the process, control to erase the second object.

17. The information processing apparatus according to claim 1, wherein the processor is configured to:

after performing control to verify the process, control to erase the second object.

18. A non-transitory computer readable medium storing a program for performing information processing and causing a processor to execute a process comprising:

acquiring a plurality of objects indicating virtual image forming apparatuses generated by using setting information set in a predetermined image forming apparatus and capable of simulating a process executed by the image forming apparatus;

performing control to synchronize the setting information between a first object among the plurality of objects and the image forming apparatus; and performing control to simulate the process executed by the image forming apparatus using a second object different from the first object, wherein the process further comprises:

acquiring the first object, duplicating the acquired object and acquire the duplicated duplication object as the second object, and performing control to verify the process by performing control to cause the second object to simulate the process executed by the image forming apparatus by using predetermined information.

19. An information processing method comprising:

acquiring a plurality of objects indicating virtual image forming apparatuses generated by using setting information set in a predetermined image forming apparatus and capable of simulating a process executed by the image forming apparatus;

performing control to synchronize the setting information between a first object among the plurality of objects and the image forming apparatus; and performing control to simulate the process executed by the image forming apparatus using a second object different from the first object, wherein the method further comprises:

acquiring the first object, duplicating the acquired object and acquire the duplicated duplication object as the second object, and performing control to verify the process by performing control to cause the second object to simulate the process executed by the image forming apparatus by using predetermined information.

* * * * *